United States Patent [19]

Gerard et al.

[11] Patent Number: 4,624,344
[45] Date of Patent: Nov. 25, 1986

[54] SPRING FOR THE PADS OF A DISC BRAKE WITH SLIDING CALIPER, AND DISC BRAKE EQUIPPED WITH SUCH A SPRING

[75] Inventors: Jean-Louis Gerard, Paris; Claude Le Marchand, Domont, both of France

[73] Assignee: Societe Anonyme D.B.A., Paris, France

[21] Appl. No.: 724,143

[22] Filed: Apr. 17, 1985

[30] Foreign Application Priority Data

Apr. 26, 1984 [FR] France ............................... 84 06584

[51] Int. Cl.$^4$ ............................................. F16D 65/02
[52] U.S. Cl. .................................. 188/73.36; 188/73.38
[58] Field of Search ............... 188/73.35, 73.36, 73.37, 188/73.38

[56] References Cited

U.S. PATENT DOCUMENTS 4,222,465  9/1980  Haraikawa et al. ......... 188/73.38 X
4,527,667  7/1985  Courbot ....................... 188/73.38 X
4,538,708  9/1985  Seki ................................. 188/73.38

FOREIGN PATENT DOCUMENTS 1189333  3/1965  Fed. Rep. of Germany ... 188/73.38
2345733  3/1975  Fed. Rep. of Germany .
  18129  2/1981  Japan ............................... 188/73.36
57-526   4/1983  Japan ............................... 188/73.37

Primary Examiner—George E. A. Halvosa
Attorney, Agent, or Firm—Larry J. Palguta; Ken C. Decker

[57] ABSTRACT

The spring (14), consisting of a metal sheet folded in the general shape of a V, incorporates a pair of main wings (15) bearing against an inside surface of the arch (7) of the sliding caliper (4) of the brake, joined by a central axial portion (16) bearing against the pads (2a, 2b), and at least one mounting wing (21), close to an axial end (18) of the spring, separated from the adjacent main wing (15) by a notch (20) and extended into an end portion forming a hook (22) engaged in an opening (25) in the arch (7) which is provided with a recessed shoulder (27) for retaining the hook (22), the axial end (18) of the spring (14), consisting advantageously of a finger folded back (24), bearing against an inside surface (11) of the inner portion (5) of the caliper which encloses a brake actuator (10).

6 Claims, 6 Drawing Figures

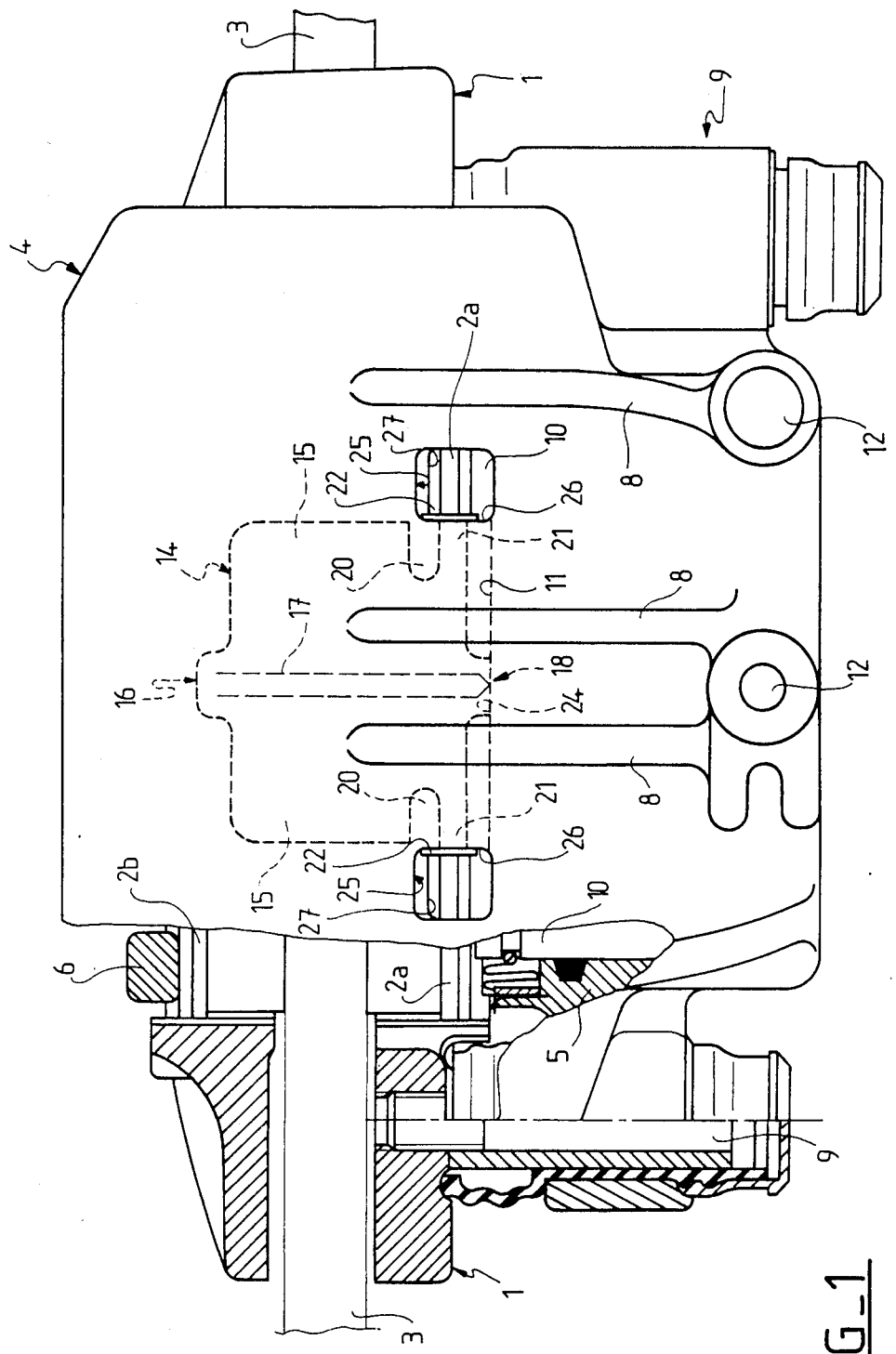
FIG_1

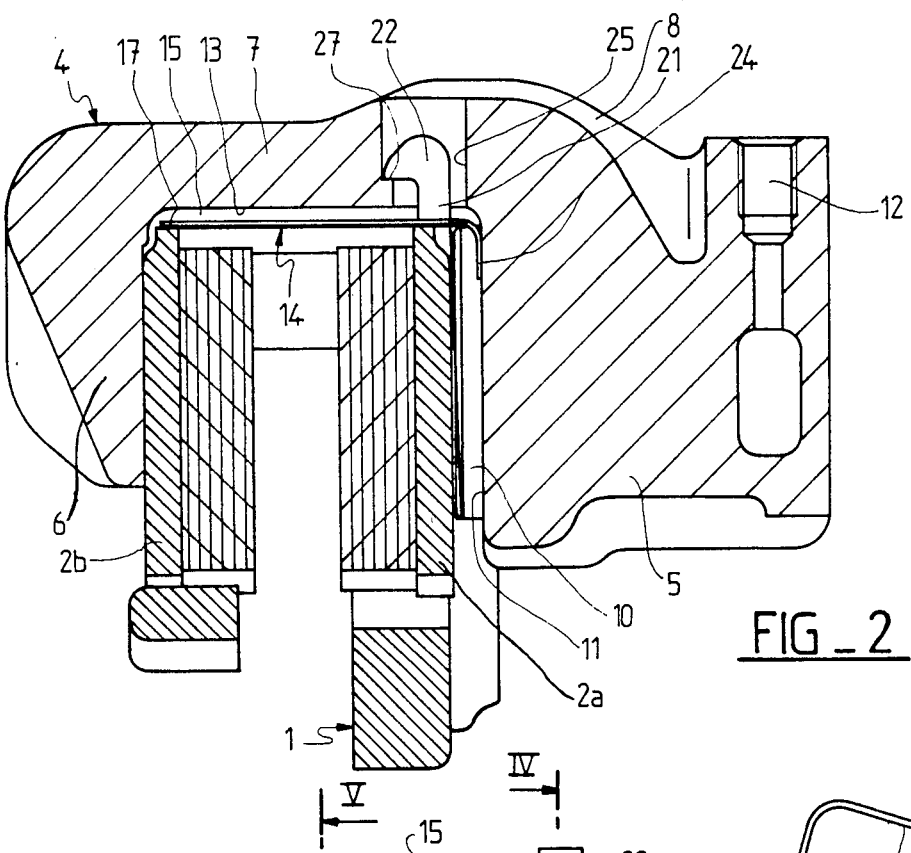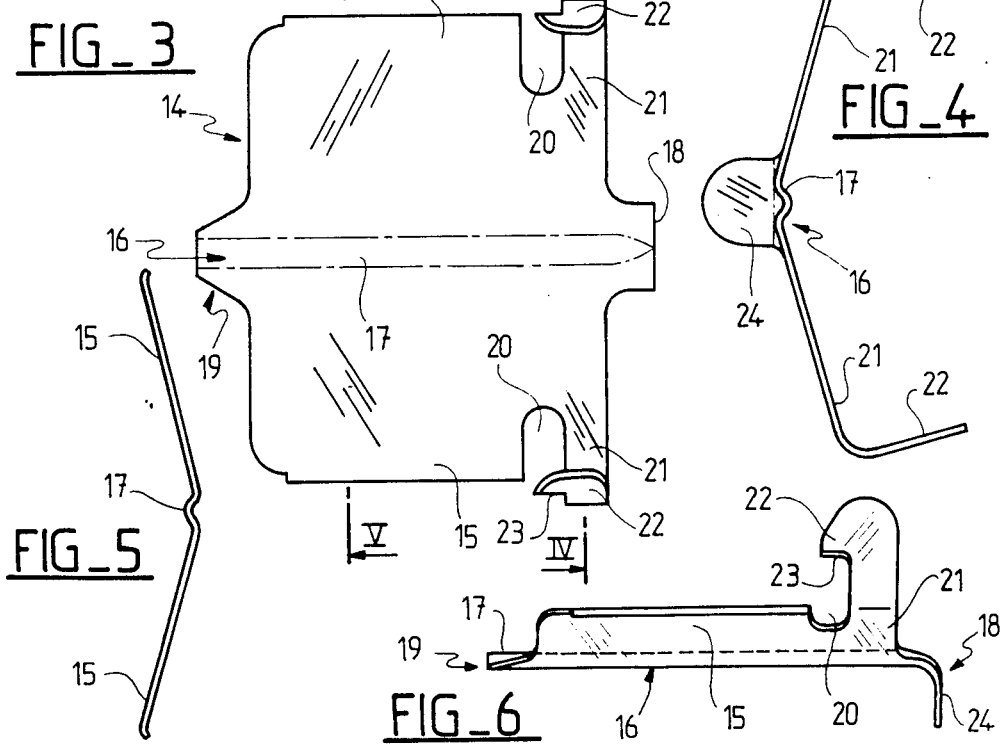

SPRING FOR THE PADS OF A DISC BRAKE WITH SLIDING CALIPER, AND DISC BRAKE EQUIPPED WITH SUCH A SPRING

The present invention concerns springs for the pads of disc brakes, and more particularly a spring for the pads of a disc brake of the type with a sliding caliper incorporating an arch overhanging a pair of pads which are spaced axially from one another, intended to be interposed between the arch of the caliper and the pads so as to push the latter in a radial direction away from the arch and to be held in elastic engagement in an opening in the arch, the spring consisting of a metal sheet folded in the general shape of a V incorporating at least one pair of main wings intended to bear at their free ends against the inside surfaces of the arch, joined by a central axial portion intended to co-operate in bearing with the pair of pads, and at least one mounting wing extending from the central portion and intended to be elastically engaged in the opening in the arch.

A disc brake with a sliding caliper provided with such a spring for the pads is described in the document DE-A-2,345,733.

In said document, the spring incorporates two mounting wings extending directly from the central portion in order to be engaged in a central opening in the arch of the caliper, the spring incorporating two pairs of main wings situated on each side of the mounting wings and each joined to the central portion along a zone of relatively weak axial extension. Such an arrangement has a number of disadvantages insofar as it requires in particular a relatively large mounting opening in a central portion of the arch of the caliper, thus weakening the latter and allowing a tendency of the caliper to open (the separation of the inner and outer portions relative to one another) during the application of high braking forces, as is generally the case in motor vehicles provided with systems of assisted braking. Also, the length of the relatively weak junction between each main wing and the central portion of the spring does not guarantee the application of a large force pushing back between the arch of the caliper and the pads. Lastly, the method of mounting by the mounting wings elastically engaged between the transverse surfaces facing the opening in the arch of the caliper does not guarantee accurate and reliable positioning of the spring in the brake.

The aim of the present invention is to propose a spring for the pads of a brake of the type mentioned above, of simple and robust construction and of low manufacturing costs, guaranteeing accurate positioning of the spring in the brake adapted for this spring and the application of a large separating force between the arch of the caliper and the pads of the brake.

To achieve this, according to a characteristic of the invention, the mounting wing is provided in the region of a first axial end of the spring, in the axial extension of the adjacent main wing, and incorporates, at its free end, a hook means extending in the direction towards the second axial end of the spring, the central portion projecting axially beyond the mounting wing so as to form the first axial end of the spring.

Another aim of the present invention is to propose a disc brake of the type mentioned above, arranged to be equipped with a spring for the pads according to the invention and possessing improved rigidity.

To achieve this, according to another characteristic of the invention, the disc brake, of the type incorporating a caliper mounted so as to slide axially on a fixed support and incorporating an inner portion in which at least one brake actuator with hydraulic piston is housed, and an outer portion, the two portions being joined by an arch incorporating an opening for mounting the spring for the pads, the inner portion of the caliper incorporating, facing the outer portion, an inside surface with respect to which the actuator piston projects, is characterized in that, in order to be equipped with a spring such as that defined above, the mounting opening is arranged in the region of the inside surface of the inner portion of the caliper, the inside surface against which the first axial end of the spring bears, the opening incorporating, in its wall which is axially opposite the inside surface, a recessed shoulder with which the hook means of the mounting wing of the spring co-operates in retentive engagement.

With such an arrangement, the mounting opening of the spring in the arch of the caliper is situated in the region of the solid inner portion of the caliper, and the opening is able to be of small dimensions sufficient to allow the engagement of the hook means of the mounting wing of the spring. In addition, despite the somewhat overhung mounting of the spring by one of its ends in the arch, the other axial end of the spring is held correctly pressing against the inside surface of the arch owing to the fact that the first axial end of the spring bears against the inside surface of the inner portion of the caliper, this bearing pressure ensuring by a locking action the retentive engagement of the hook means of the mounting wing in the opening in the arch.

Other characteristics and advantages of the present invention will emerge from the following description of an embodiment, given by way of illustration but not limiting in any way, with reference to the accompanying drawings, in which:

FIG. 1 is a plan view, partially sectioned, of a disc brake with sliding caliper equipped with a spring for the pads of the brake according to the invention;

FIG. 2 is a diagramatic view in axial section of the brake shown in FIG. 1;

FIG. 3 is a plan view of a spring for the pads according to the invention, for equipping the brake shown in FIGS. 1 and 2;

FIGS. 4 and 5 are views in transverse section through the section planes IV—IV and V—V shown in FIG. 3, respectively; and FIG. 6 is a side view of the spring shown in FIG. 3.

The disc brake with sliding caliper shown in FIGS. 1 and 2 incorporates in a conventional manner a fixed support 1, in an opening of which a pair of friction pads 2a, 2b are mounted so as to be anchored and to slide, situated on each side of a brake disc 3. A sliding caliper is also mounted on the fixed support 1, the caliper, designated generally by the reference 4, incorporating an inner portion 5 (in accordance with the usual orientation of such a brake in a vehicle wheel) enclosing at least one brake actuator directly actuating the inner pad 2a, and an outer portion or nose 6, actuating the outer pad 2b by reaction, the two portions 5 and 6 being joined by a caliper arch 7 overhanging the pads 2a, 2b and the disc 3. The inner portion 5 and the zone adjacent to the arch 7 are advantageously reinforced by ribs for increasing rigidity such as those shown at 8.

In the embodiment shown by way of example in FIGS. 1 and 2, the caliper 4 is mounted so as to slide on the fixed support 1 by means of a pair of pillars 9, which in this case are firmly fixed to the fixed support. In this embodiment, the inner portion of the caliper 5 incorporates two brake actuators spaced transversely from one another (the axial direction being defined by the axis of the disc 3), the pistons 10 of which may be seen, which project axially so as to push the inner pad 2a directly, relative to an inside surface 11 of the inner portion 5 of the caliper facing a corresponding inside surface of the outer portion 6 of this caliper. The hydraulic actuators are joined to respective braking systems through connection openings 12.

As may be seen more clearly in FIGS. 2 to 6, a spring 14, which is described below in detail, is situated between the inside surface 13 of the arch 7 of the caliper 4 and the adjacent upper edges of the support plates of the pads 2a and 2b. The spring 14 consists of an elastic metal sheet folded in the general shape of an open V incorporating a pair of main wings 15 lying symmetrically on each side of a central axial portion 16 advantageously provided with an axial fold forming a rib 17. The central portion 16 incorporates a first axial end 18 projecting axially relative to the wings and advantageously a second axial end 19 also projecting axially relative to the wings. In the region of the first axial end 18 of the spring a notch 20, extending from the outside inwards over a distance of less than half the transverse width of the associated wing 15, defines in this main wing 15 (and advantageously, symmetrically, in each of the main wings 15 as shown) a mounting wing portion 21, coplanar with the corresponding main wing 15 and extending at its free end into an end portion extending in the same direction as the mounting wing 21 but folded back towards the opposite main wing to form a hook 22 having a shoulder 23 lying essentially axially over a portion of the axial extension of the notch 20. As is seen clearly in FIGS. 4 and 6, according to a feature of the invention, the central portion 16 is extended, in the region of the first axial end 18 of the spring 14, into a finger 24 which is folded back essentially perpendicular to this central portion 16 in the opposite direction to the wings 15 and 21. Preferably, as may be seen in FIGS. 5 and 6, the lateral edges of the main wings 15 are lapped downwards slightly to facilitate their sliding when bearing against the inside surface 13 of the arch 7 of the caliper 4.

Referring once again to FIGS. 1 and 2, it is seen that the arch 7 of the caliper 4 has, in the region of the inside surface 11 of the inner portion 5 of the caliper, at least one, typically two, openings 25 advantageously opening upwards through the arch of the caliper, situated symmetrically on each side of the principal plane of the caliper so as to accept the hooks 22 of the mounting wings 21 of the spring 14. These hooks 22 are introduced by force, by separating them, against the adjacent axial surfaces 26 of the openings 25 and are pushed (upwards from below, as shown in FIG. 2) into these openings 25 until the shoulders 23 of the hooks 22 reach a recessed shoulder 27 formed in the wall of each opening 25 axially opposite the inside surface 11, this movement upwards from below of the spring 14 being accompanied by prestressing in bending the main wings 15, bearing at their free ends against the inside surface 13 of the arch 7. The engagement of the hook 22 on the shoulder 27 is locked by the finger 24 bearing elastically against the inside surface 11 of the inner portion 5 of the caliper, this force also applying a moment to the spring 14 which holds the zone of the second axial end 19 of the spring pressing against the arch and thus preventing, for example, undesirable separation of this second end from the inside surface 13 of the arch 7, thus ensuring, in the operating configuration of the brake, the application of an essentially constant separating force between the arch 7 of the caliper 4 and each of the pads 2a and 2b, thus properly pressing the latter against the surfaces for anchoring and for sliding of the fixed support 1.

The spring 14 is made, for example, from stainless steel strip approximately 0.35 mm thick and is shaped to provide a force on the pads of between approximately 5 and 8 daN.

Although the present invention is described above relating to a particular embodiment it is not limited by it, but on the contrary is capable of modifications and variants which will be apparent to a person versed in the art.

We claim:

1. In a sliding caliper disc brake having an arch overhanging a pair of brake pads spaced axially apart from one another and a spring resiliently engaging the brake pads, the spring interposed between the arch and brake pads to push the brake pads in a radial direction away from the arch, the spring comprising a metal sheet folded in the general shape of a V and incorporating a pair of main lateral wings which bear at respective free ends against an inside surface of the arch, the main lateral wings joined by an axial central portion in bearing engagement with the pair of brake pads, and a pair of lateral mounting wings extending from the central portion and having free ends elastically engaging the arch in respective openings in the arch, the lateral mounting wings provided adjacent a first axial end of the spring and comprising axial extensions of the respective main lateral wings, each associated main lateral wing and lateral mounting wing being disposed at least partly in a plane emanating from the central portion, each lateral mounting wing having at a free end thereof hook means resiliently engaging said arch in the respective opening and extending in an axial direction toward a second axial end of the spring, the central portion projecting axially beyond the lateral mounting wings to form the first axial end of the spring, each lateral mounting wing separated from the associated main lateral wing by a notch extending circumferentially inwardly, relative to the disc, through a portion of the transverse width of the respective main lateral wing in order to provide an axial separation between the lateral mounting wing and main lateral wing, the first axial end engaging resiliently a radial surface of the caliper so that the resilient engagement between each hook means of a free end and the respective arch and the engagement of the first axial end with the radial surface effect a moment to the spring to maintain the free ends of the main lateral wings in resilient engagement with the inside surface of the arch.

2. The spring according to claim 1, wherein the first axial end terminates in a finger folded back in a direction substantially perpendicular to the central portion.

3. The spring according to claim 1, wherein each hook means comprises an extension of an associated lateral mounting wing and is folded back toward an opposite main lateral wing.

4. The spring according to claim 1, wherein the lateral mounting wings include at least portions extending substantially perpendicularly from the associated main lateral wings.

5. The disc brake according to claim 1, wherein the openings extend radially through said arch and each opening having a recessed axial shoulder with which the associated hook means engages in a retentive, resilient engagement.

6. The disc brake according to claim 1, wherein the caliper includes two brake actuators.

* * * * *